Patented Apr. 7, 1925.

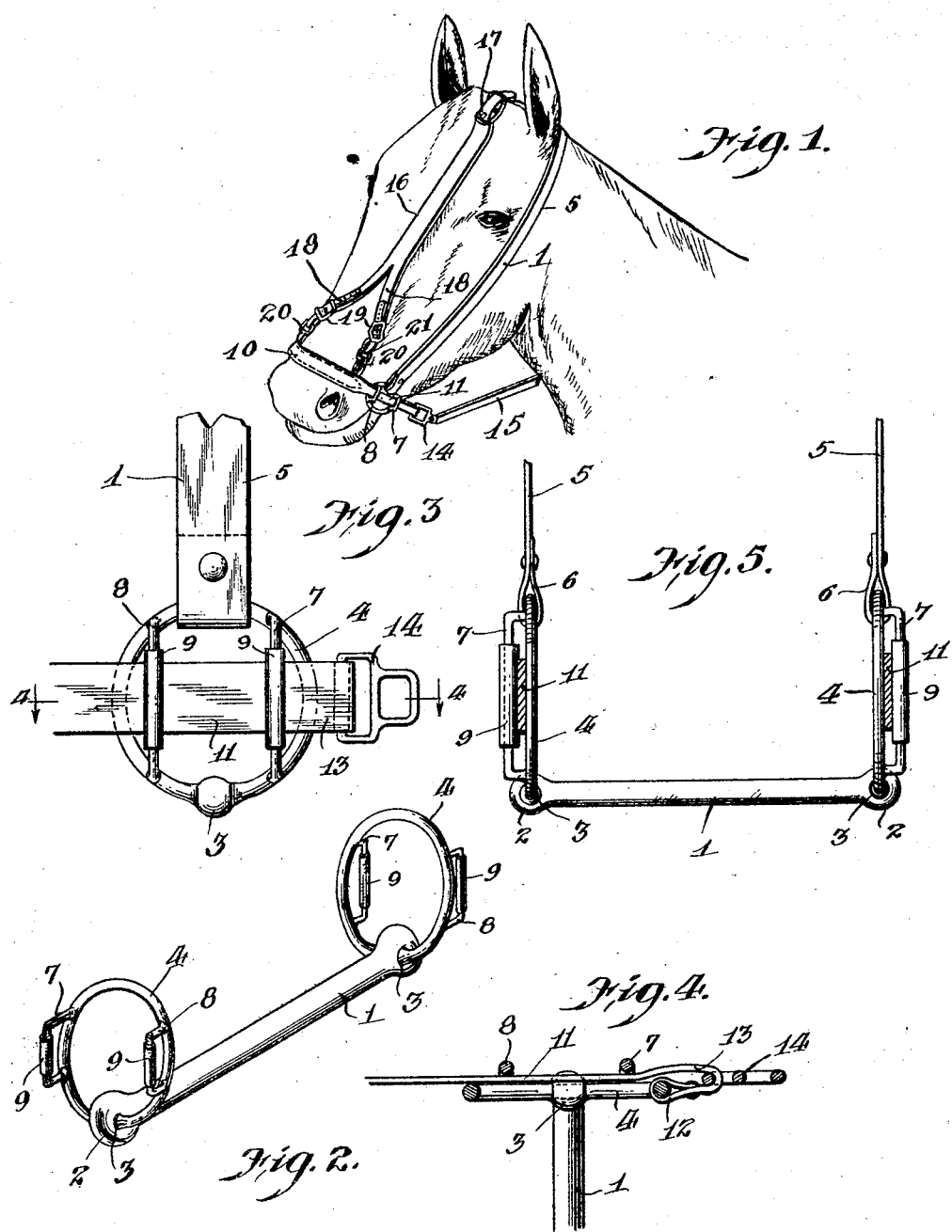

1,532,622

UNITED STATES PATENT OFFICE.

EDOR ERICKSON, OF PHILIPSBURG, MONTANA.

BRIDLE BIT.

Application filed August 6, 1924. Serial No. 730,459.

*To all whom it may concern:*

Be it known that I, EDOR ERICKSON, a citizen of the United States, and resident of Philipsburg, in the county of Granite and State of Montana, have invented certain new and useful Improvements in Bridle Bits, of which the following is a specification.

My invention is an improvement in bridle bits, and it consists in the combinations, constructions and arrangements herein described and claimed.

An object of the invention is to provide a bridle bit which affords facilities for guiding and controlling the movement of an animal to which the bit has been applied effectively without likelihood of injury to the mouth of the animal even though the mouth of the animal be relatively tender and a relatively great pull on the bridle reins be required to maintain control of the animal.

A further object of the invention is to provide a bridle bit which will be effective to control an animal which is vicious or difficult of control since the device affords facilities for constricting the nostrils of the animal and to thus interfere with the breathing of the animal.

A further object of the invention is to provide a bridle bit of the character described which includes bit-rings and means associated therewith for preventing the bit-rings from being drawn into the mouth of the animal to which the device is applied, thereby preventing pinching, squeezing or other injury to the mouth of the animal.

A still further object of the invention is to provide a bridle bit which affords facilities for maintaining control of the animal without interfering with the free use of the mouth by the animal.

Other objects and advantages will be apparent from the following description, considered in conjunction with the accompanying drawings, in which—

Figure 1 is a perspective view showing a bridle bit embodying the invention in applied position, Figure 2 is a perspective view showing the mouth piece and bit rings of the device, Figure 3 is a fragmentary side elevation of one of the bit rings and associated parts of the device, Figure 4 is a section along the line 4—4 of Figure 3, Figure 5 is a side elevation of the mouth piece, bit ring and fragmentary portion of the cheek strap.

In carrying out the invention, I make use of a mouth piece 1 which may be a straight rigid bar enlarged at its ends at 2, the enlargements being provided with transverse openings in which are swiveled enlarged portions 3 of bit rings 4. The arrangement is such that the bit ring 4 is prevented from moving about its center through the opening of the mouth piece in which the enlarged portion of the bit ring is received but is permitted to swing bodily about the axis of the enlarged portion 3 thereof. The side portions 5 of the usual bridle strap are attached at their lower ends to the bit rings as by means of the loops 6 so that the mouth piece 1 will be retained in the mouth of a horse or like animal when bridle strap is in applied position on the neck of the animal, as illustrated in Figure 1. Each bit ring 4 is provided on its outer face with a pair of opposite substantially U-shaped guides 7 and 8 respectively. The guide 7 is carried by the portion of the bit ring which is positioned at the side of the lower jaw of the animal while the guide 8 carried by the portion of the bit ring that is positioned alongside of the upper jaw of the animal when the mouth piece is disposed in the mouth of the animal and is held therein by the bridle straps. The guide 7 will therefore be termed the rear guide and the guide 8 will be termed the front guide in the following description. The arms of each guide 7 are of slightly greater strength than the arms of the associated guide 8 so that the web portions of the guide 7 will be spaced a greater distance from the plane of the bit ring on which it is supported than is the web portion of the associated guide 8. The web portion of the each of the guides 7 and 8 carries a roller 9.

The nose band has a padded intermediate portion 10 which extends across the nostrils of the animal and end straps 11 which are extended through the guides 8, 7 between the rollers 9 and the portions of the bit rings which extend between the arms of the U-shaped guides, the ends of the attaching straps 11 being turned forwardly on themselves and attached to the bit rings as at 12, almost directly under the rear guides 7, thus providing rearwardly extending loop portions in the end portions of the nose band as indicated at 13 in Figure 4. Suitable fastening devices, such as the double rings 14 are attached to the half loops 13 of the nose band as by means of rollers which extend through the half loops 13 and are slidable along the latter. Each of the fastening devices 14 is adapted for connection with a bridle rein as indicated at 15.

The nose band 10 is retained in a desirable position by means of an adjustable spacing means which comprises a strap 16 which is adjustably connected at its upper end, as at 17 to the crown portion of the bridle strap. The strap 16 is bifurcated at its lower end and the furcations, indicated at 18 diverge toward their lower ends and are provided at their lower ends with harness loops 19.

The nose band 10 is provided at spaced apart points with fastening devices such as the straps 20, each of which is attached to the nose band and carries a bridle square 21 through which the lower end portion of one of the furcations 18 extends, said end portion of the furcation 18 then being turned upwardly and being adjustably engageable with the associated harness loop 19, whereby the nose band may be supported by the strap 16.

From the foregoing description of the various parts of the device, the operation thereof may be readily understood. A pull on the reins will be distributed equally between the mouth piece and the nose band. Therefore, the device is effective to bring an animal which is difficult to manage under control since a continued pull on the reins will tend to interrupt the breathing of the animal. This will be true even though the animal shall have gripped the mouth piece between its teeth. Since the nose band is padded, it will not chafe or cause soreness of the animal's muzzle. Since the pull on the reins is distributed equally between the nose band and the mouth piece the likelihood of injury to the mouth of the animal because of the mouth piece being jerked thereagainst is practically precluded.

Obviously, my invention is susceptible of embodiment in forms other than that illustrated in the accompanying drawing and I therefore consider as my own all such modifications and adaptations of the form of the device herein described as fairly fall within the scope of the appended claims.

I claim:—

1. In a bridle bit, a mouth piece, bit rings at the ends of the mouth piece, a guiding and retaining member on the outer face of each bit ring, a nose band having end portions extended between said guiding and retaining members and the bit rings and the extremities of said end portions attached to said bit rings, and means whereby reins may be attached at their ends to the end portions of said nose band between said guiding and retaining members and the extremities of the nose band.

2. In a bridle bit, a mouth piece, bit rings at the ends of the mouth piece, said bit rings having a pair of outwardly extending substantially U-shaped guiding and retaining members respectively carried by the forward and rearward portions of the bit rings, and a nose band having end portions extended between said guiding and retaining members and the bit rings and the extremities of said end portions attached to the rearward portions of the bit rings.

3. In a bridle bit, a mouth piece, bit rings at the ends of the mouth piece, said bit rings having a pair of outwardly extending substantially U-shaped guiding and retaining members respectively carried by the forward and rearward portions of the bit rings, and a nose band having end portions extended between said guiding and retaining members and the bit rings and the extremities of said end portions attached to the rearward portions of the bit rings, the arms of the front guiding and retaining members being of less length than the arms of the rear guiding and retaining members.

4. In a bridle bit, a mouth piece, bit rings swiveled in the end portions of said mouth piece, each of said bit rings having a pair of substantially U-shaped outwardly extending guiding and retaining members joined thereto at the ends of the arms of said guiding and retaining members, one of the guiding and retaining members being joined to the rearward portion of the bit rings and the other of said pair of guiding and retaining members being joined to the forward portion of the bit ring and a nose band having end portions extended between the guiding and retaining members and the bit rings and having the extreme end portions thereof doubled under and attached to the rearward portions of the bit rings, thus providing attaching half loops in the end portions of the nose band between the rear guiding and retaining members and the rearward portions of the bit rings.

5. In a bridle bit, a mouth piece, bit rings swiveled in the end portions of said mouth piece, each of said bit rings having a pair of substantially U-shaped outwardly extending guiding and retaining members joined thereto at the ends of the arms of said guiding and retaining members, one of the guiding and retaining members being joined to the rearward portion of the bit rings and the other of said pair of guiding and retaining members being joined to the forward portion of the bit ring, a nose band having end portions extended between the guiding and retaining members and the bit rings and having the extreme end portions thereof doubled under and attached to the rearward portions of the bit rings, thus providing attaching half loops in the end portions of the nose band between the rear guiding and retaining members and the rearward portions of the bit rings, and means whereby the ends of reins may be attached to said half loops.

EDOR ERICKSON.

Certificate of Correction.

It is hereby certified that in Letters Patent No. 1,532,622, granted April 7, 1925, upon the application of Edor Erickson, of Philipsburg, Montana, for an improvement in " Bridle Bits," errors appear in the printed specification requiring correction as follows: Page 1, line 94, for the word " strength " read *length*, and line 100, strike out the article " the " first occurrence; and that the said Letters Patent should be read with these corrections therein that the same may conform to the record of the case in the Patent Office.

Signed and sealed this 30th day of June, A. D. 1925.

[SEAL.]                        KARL FENNING,
*Acting Commissioner of Patents.*